United States Patent
Davidson et al.

(10) Patent No.: US 6,223,062 B1
(45) Date of Patent: *Apr. 24, 2001

(54) COMMUNICATIONS INTERFACE ADAPTER

(75) Inventors: Steven Frederic Davidson, Skokie; Daniel Gerard Maglaya, Bartlett, both of IL (US); Donald A. Sofia, Sheboygan, WI (US); Stuart John Collar, Algonquin; Jeffrey Jay Stone, North Barrington, both of IL (US)

(73) Assignee: Northrop Grumann Corporation, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/079,774

(22) Filed: May 15, 1998

(51) Int. Cl.[7] .................................... H04B 1/38

(52) U.S. Cl. ............................ 455/575; 455/557; 455/90

(58) Field of Search .................................. 455/575, 557, 455/351, 90, 568, 569, 345, 346, 347, 350, 369, 556

(56) References Cited

U.S. PATENT DOCUMENTS

| | | | |
|---|---|---|---|
| D. 265,402 | 7/1982 | Fukushima et al. | D14/68 |
| D. 267,249 | 12/1982 | Fukushima et al. | D14/68 |
| D. 298,242 | 10/1988 | Watanabe | D14/64 |
| D. 309,136 | 7/1990 | Siddoway | D14/137 |
| D. 339,128 | 9/1993 | Claxton et al. | D14/138 |
| D. 368,711 | 4/1996 | Wicks et al. | D14/138 |
| D. 378,678 | 4/1997 | Tyneski et al. | D14/137 |
| D. 378,816 | 4/1997 | Hino | D14/138 |
| D. 383,745 | 9/1997 | Lindeman et al. | D14/137 |
| D. 384,059 | 9/1997 | Hockneberry et al. | D14/137 |
| D. 385,269 | 10/1997 | Kim | D14/137 |
| D. 385,270 | 10/1997 | Yahaya | D14/137 |
| D. 393,260 | 4/1998 | Yahaya | D14/137 |
| D. 393,638 | 4/1998 | Page et al. | D14/137 |
| 3,906,166 * | 9/1975 | Cooper et al. | 455/437 |
| 3,916,312 | 10/1975 | Campbell | 325/16 |
| 3,917,372 | 11/1975 | Selinko | 339/75 |
| 4,025,721 | 5/1977 | Groupe et al. | 179/1 P |
| 4,031,468 | 6/1977 | Ziebell et al. | 325/312 |
| 4,052,568 | 10/1977 | Jankowski | 179/15 |
| 4,156,797 | 5/1979 | Hoole | 179/1 |
| 4,227,258 | 10/1980 | Root et al. | 455/348 |
| 4,277,645 | 7/1981 | May, Jr. | 179/1 |
| 4,325,142 | 4/1982 | Nakazawa | 455/89 |
| 4,374,301 | 2/1983 | Jrieder, Jr. | 179/1 |
| 4,417,102 | 11/1983 | Allen | 364/513 |
| 4,484,344 | 11/1984 | Mai et al. | 381/46 |
| 4,621,373 | 11/1986 | Hodsdon | 455/89 |
| 4,625,083 | 11/1986 | Poikela | 379/389 |

(List continued on next page.)

*Primary Examiner*—Dwayne D. Bost
*Assistant Examiner*—Joy Redmon
(74) *Attorney, Agent, or Firm*—Terry J. Anderson; Karl J. Hoch, Jr.

(57) ABSTRACT

A communications interface adapter facilitates both wired and wireless communications between crew members of a vehicle having a wired intercom and has an intercom communications circuit having an input/output port for providing electrical communication between the interface adapter and the wired intercom and also has a fixed radio transceiver. The fixed radio transceiver comprises a receive circuit for receiving radio communications and for communicating the received radio communications via the intercom communications circuit to the wired intercom of the vehicle and a transmit circuit for transmitting communications received via the intercom communication circuit from the wired intercom of the vehicle. A crew member is provided wired communications with the wired intercom when the crew member's headset is in electrical communication with the wired intercom and is provided wireless communications with the wired intercom via the fixed radio transceiver and the crew member's portable radio transceiver when the crew member's headset is not in electrical communication with the wired intercom.

11 Claims, 1 Drawing Sheet

U.S. PATENT DOCUMENTS

| | | | |
|---|---|---|---|
| 4,627,107 | 12/1986 | Hohlfeld et al. | 455/11 |
| 4,654,882 | 3/1987 | Ikeda | 455/88 |
| 4,682,367 | 7/1987 | Childress et al. | 455/17 |
| 4,734,049 | 3/1988 | George et al. | 439/259 |
| 4,754,484 | 6/1988 | Larkin et al. | 379/430 |
| 4,761,823 | 8/1988 | Fier | 455/89 |
| 4,882,746 | 11/1989 | Shimada | 379/61 |
| 4,903,325 | 2/1990 | Yoshitake et al. | 455/89 |
| 4,905,272 | 2/1990 | Van de Mortel et al. | 379/62 |
| 4,955,050 | 9/1990 | Yamauchi | 379/59 |
| 4,993,065 | 2/1991 | Chiou | 379/430 |
| 5,020,090 | 5/1991 | Morris | 379/58 |
| 5,023,936 | 6/1991 | Szczutkowski et al. | 455/90 |
| 5,038,400 | 8/1991 | Baracat et al. | 455/90 |
| 5,081,641 | 1/1992 | Kotzin et al. | 375/1 |
| 5,121,391 | 6/1992 | Paneth et al. | 370/95.1 |
| 5,121,504 | 6/1992 | Toko | 455/90 |
| 5,128,959 | 7/1992 | Bruckert | 375/1 |
| 5,133,001 | 7/1992 | Bohm | 379/58 |
| 5,140,628 | 8/1992 | Murata et al. | 379/61 |
| 5,170,494 | 12/1992 | Levanto | 455/90 |
| 5,189,358 | 2/1993 | Tomura et al. | 320/2 |
| 5,191,593 | 3/1993 | McDonald et al. | 375/1 |
| 5,193,217 | 3/1993 | Lunn et al. | 455/79 |
| 5,230,016 | 7/1993 | Yasuda | 379/58 |
| 5,230,080 | 7/1993 | Fabre et al. | 455/15 |
| 5,247,567 | 9/1993 | Hirano | 379/61 |
| 5,255,308 | 10/1993 | Hashimoto et al. | 379/61 |
| 5,259,017 | 11/1993 | Langmantel | 379/58 |
| 5,259,020 | 11/1993 | Hirano | 379/61 |
| 5,261,121 | 11/1993 | Hashimoto | 455/89 |
| 5,263,047 | 11/1993 | Kotzin et al. | 375/1 |
| 5,265,150 | 11/1993 | Helmkamp et al. | 379/58 |
| 5,274,634 | 12/1993 | Babiarz | 370/60 |
| 5,276,680 | 1/1994 | Messenger | 370/85.1 |
| 5,276,765 | 1/1994 | Freeman et al. | 395/2 |
| 5,283,806 | 2/1994 | Dartois et al. | 375/1 |
| 5,283,817 | 2/1994 | Hara et al. | 379/61 |
| 5,293,588 | 3/1994 | Sutoh et al. | 395/2.42 |
| 5,297,142 | 3/1994 | Paggeot et al. | 370/85.6 |
| 5,305,467 | 4/1994 | Herndon et al. | 455/56.1 |
| 5,325,419 | 6/1994 | Connolly et al. | 379/60 |
| 5,353,331 | 10/1994 | Emery et al. | 379/58 |
| 5,365,572 | 11/1994 | Saegusa et al. | 379/61 |
| 5,390,233 | 2/1995 | Jensen et al. | 379/58 |
| 5,406,615 | 4/1995 | Miller, II et al. | 379/59 |
| 5,408,496 | 4/1995 | Ritz et al. | 375/202 |
| 5,410,632 | 4/1995 | Hong et al. | 395/2.42 |
| 5,410,737 | 4/1995 | Jones | 455/56.1 |
| 5,416,828 | 5/1995 | Hiramatsu et al. | 379/58 |
| 5,440,613 | 8/1995 | Fuentes | 379/60 |
| 5,442,659 | 8/1995 | Bauchot et al. | 375/202 |
| 5,446,769 | 8/1995 | Shaver et al. | 375/202 |
| 5,448,757 | 9/1995 | Hirata | 455/43 |
| 5,459,814 | 10/1995 | Gupta et al. | 395/2.42 |
| 5,465,401 | 11/1995 | Thompsom | 455/89 |
| 5,469,496 | 11/1995 | Emery et al. | 379/58 |
| 5,471,503 | 11/1995 | Altmaier et al. | 375/202 |
| 5,481,591 | 1/1996 | Suzuki | 379/58 |
| 5,487,175 | 1/1996 | Bayley et al. | 455/54.2 |
| 5,493,703 | 2/1996 | Yamashita | 455/89 |
| 5,504,803 | 4/1996 | Yamada et al. | 379/59 |
| 5,506,887 | 4/1996 | Emery et al. | 379/58 |
| 5,509,053 | 4/1996 | Gowda et al. | 379/63 |
| 5,509,406 | 4/1996 | Kock et al. | 128/203.14 |
| 5,513,248 | 4/1996 | Evans et al. | 379/61 |
| 5,519,763 | 5/1996 | Namekawa et al. | 379/61 |
| 5,533,097 | 7/1996 | Crane et al. | 379/58 |
| 5,537,459 * | 7/1996 | Price et al. | 455/435 |
| 5,555,448 | 9/1996 | Thiede et al. | 455/89 |
| 5,568,536 | 10/1996 | Tiller et al. | 379/58 |
| 5,574,775 | 11/1996 | Miller, II et al. | 379/60 |
| 5,579,535 | 11/1996 | Orlen et al. | 455/33.1 |
| 5,590,406 | 12/1996 | Bayley et al. | 455/54.2 |
| 5,590,417 | 12/1996 | Rydbeck | 455/89 |
| 5,594,777 | 1/1997 | Makkonen et al. | 379/58 |
| 5,594,952 | 1/1997 | Virtuoso et al. | 455/89 |
| 5,596,333 | 1/1997 | Bruckert | 342/457 |
| 5,602,843 | 2/1997 | Gray | 370/338 |
| 5,603,081 | 2/1997 | Raith et al. | 455/33.1 |
| 5,606,560 | 2/1997 | Malek et al. | 370/347 |
| 5,610,972 | 3/1997 | Emery et al. | 379/58 |
| 5,619,493 | 4/1997 | Ritz et al. | 370/330 |
| 5,619,553 | 4/1997 | Young et al. | 379/61 |
| 5,625,673 | 4/1997 | Grewe et al. | 379/61 |
| 5,625,877 | 4/1997 | Dunn et al. | 455/34.1 |
| 5,633,911 | 5/1997 | Han et al. | 379/58 |
| 5,640,689 | 6/1997 | Rossi | 455/89 |
| 5,649,055 | 7/1997 | Gupta et al. | 395/2.42 |
| 5,655,621 | 8/1997 | Yamashita et al. | 455/463 |
| 5,657,375 | 8/1997 | Connolly et al. | 455/436 |
| 5,657,422 | 8/1997 | Janiszewski et al. | 395/2.37 |
| 5,659,594 | 8/1997 | Toda | 455/552 |
| 5,659,882 | 8/1997 | Fukutomi | 455/425 |
| 5,659,890 | 8/1997 | Hidaka | 455/575 |
| 5,664,005 * | 9/1997 | Emery et al. | 455/422 |
| 5,675,629 | 10/1997 | Raffel et al. | 379/58 |
| 5,774,793 | 6/1998 | Cooper et al. | 455/89 |
| 5,784,685 * | 7/1998 | Stanford et al. | 455/31.2 |
| 5,937,334 * | 8/1999 | Peterson et al. | 455/74.1 |
| 5,946,616 * | 8/1999 | Schornack et al. | 455/422 |
| 6,041,243 * | 3/2000 | Davidson et al. | 455/575 |

* cited by examiner

COMMUNICATIONS INTERFACE ADAPTER

RELATED APPLICATIONS

This patent application incorporates by reference the contents of U.S. patent application Ser. No. 09/079,443, filed on even date herewith, and entitled PERSONAL COMMUNICATIONS UNIT.

FIELD OF THE INVENTION

The present invention relates generally to telecommunications and more particularly to a communications interface adapter for facilitating both wired and wireless communications between crew members of a vehicle having a wired intercom.

BACKGROUND OF THE INVENTION

Wired intercoms for facilitating communications between crew members of military vehicles such as tanks and armored personnel carriers are well known. Such contemporary wired intercom systems comprise a wired communications system within the vehicle itself, as well as headsets which must be worn by the crew members and plugged into the wired intercom system of the vehicle.

However, those skilled in the art will appreciate that such wired intercom systems possess the inherent limitation of being unusable by a crew member who is physically disconnected, i.e., not plugged into, the wired intercom system of the vehicle. Thus, when it is necessary for a crew member to bail out or leave the vehicle, that crew member can no longer communicate directly with the vehicle wired intercom system according to such contemporary technology.

In an effort to mitigate the problems associated with bailing out of a vehicle, crew members may be provided with two-way walkie-talkies or radio transceivers. However, as those skilled in the art will appreciate, such radio transceivers do not communicate directly with the wired intercom system of the vehicle, but rather communicate only with a radio transceiver of the vehicle, typically operated by a radioman or other crew member. Thus, direct communications with the entire crew is not maintained when a person outside of the vehicle communicates via such a radio transceiver.

Those skilled in the art will further appreciate that it is sometimes important for the crew member who has left the vehicle to communicate directly to a member of the crew other than the radioman or other crew member who is operating a radio transceiver within the vehicle. For example, it may be important to tell the driver of the vehicle (who may not be operating the radio transceiver) that it is necessary to perform a particular maneuver in order to avoid damage to the vehicle and/or injury to the crew members. Thus, it will be appreciated that it is very desirable for such a member of the crew, who has left the vehicle, to remain in direct communication with all members of the crew of the vehicle.

In view of the foregoing, it is desirable to provide means for communicating with substantially the entire crew of a vehicle, such as a tank or armored personnel carrier, by a crew member who has bailed out or left the vehicle and has thus unplugged himself from the vehicles wired communications system.

SUMMARY OF THE INVENTION

The present invention specifically addresses and alleviates the above mentioned deficiencies associated with the prior art. More particularly, the present invention comprises a communications interface adapter for facilitating both wired and wireless communications between crew members of a vehicle, such as a tank or armored personnel carrier, which has a wired intercom and wherein at least some crew members have a headset and a portable radio transceiver. Thus, communication between one or more dismounted crewmen or between crewmen and other vehicles can be maintained.

The communications interface adapter of the present invention comprises an intercom communications circuit having an input/output port for providing electrical communication between the communications interface adapter and the wired intercom, and also comprises a fixed radio transceiver.

The fixed radio transceiver comprises a receive circuit for receiving radio communications and for communicating the received radio communications via the intercom communication circuit to the wired intercom of the vehicle. The fixed radio transceiver also comprises a transmit circuit for transmitting (via the fixed radio transceiver) communications received via the intercom communication circuit from the wired intercom of the vehicle.

A crew member is provided with wired communications with the wired intercom when the crew member's headset is in electrical communication with the wired intercom and is provided wireless communications with the wired intercom via the fixed radio transceiver of the communication interface adapter and the crew member's portable radio transceiver when the crew member's headset is not in electrical communication with the wired intercom.

The fixed radio transceiver preferably comprises a local antenna disposed proximate the communications interface adapter and a remote antenna disposed externally with respect to the vehicle.

The communications interface adapter preferably further comprises a selector switch for selecting either the local antenna or the remote antenna. Alternatively, both antennas may be used simultaneously.

The communications interface adapter of the present invention preferably further comprises a data port in electrical communication with the intercom communication circuit for facilitating communication of digital data via the wired intercom of the vehicle.

The communications interface adapter of the present invention preferably further comprises a headset port for facilitating electrical communication with a headset. Alternatively, all of the headsets of the crew members may be directly attached to the wired intercom system.

According to the preferred embodiment of the present invention, a first housing within which the intercom communication circuit and the fixed radio transceiver are disposed is configured so as to facilitate attachment thereof to a vehicle bulkhead intermediate to the vehicle bulkhead and a crew station (e.g., Full Function Crew Station). In this manner, the communications interface adapter of the present invention is sandwiched between the Crew Station and the vehicle bulkhead. Those skilled in the art will appreciate that a Crew Station is the contemporary wired intercom interface adapter to which a headset connects in military vehicles which use the AN/VIC-1,2,3, and 4 wired intercom systems.

The communications interface adapter of the present invention preferably further comprises a second housing within which control circuitry for the communications interface adapter is disposed. The control circuitry disposed within the second housing preferably comprises a rotary selector switch for selecting the operating modes (MONITOR—a receive only mode; LOCAL, disabling the external antenna and limiting wireless functions to within the vehicle; BROADCAST, transmitting and receiving from wireless personal communications units onboard and/or offboard the vehicle; and GROUP, permitting two or more vehicles to communicate), and a pair of up/down selector switches for changing volume or channel assignments associated with the wireless communication. The first housing and the second housing of the communications interface adapter of the present invention are preferably in electrical communication with one another via a cable.

Thus, according to the present invention, means for communicating with substantially the entire crew of a vehicle, such as a tank or armored personnel carrier, by a crew member who has bailed out or left the vehicle and has thus unplugged himself from the vehicles wired communications system is provided.

The present invention preferably further comprises a communications interface adapter for providing full duplex digital communications between multiple users having radio transceivers, wherein the communications interface adapter comprises a radio receiver for receiving a plurality of radio communications, a multiplexer for multiplexing the plurality of radio communication into a composite signal, and a radio transmitter for transmitting the composite signal. Multiplexing the plurality of radio communications facilitates simultaneous reception thereof by each of the radio transceivers.

The multiplexer preferably comprises a summer for summing the wireless communications together. The multiplexer is preferably configured to sum the wireless communications over a predetermined time interval.

The radio receiver is preferably configured to receive a plurality of audio signals and the multiplexer is preferably configured to multiplex the wireless communications into a composite audio signal.

Alternatively, the radio receiver is configured to receive at least one audio signal and/or at least one data signal and the multiplexer is configured to multiplex the wireless communications into a composite audio/data signal.

The communications interface adapter preferably further comprises an intercom communication circuit for receiving at least one wired intercom signal. The multiplexer is preferably configured to combine the wired intercom signal with the plurality of wireless communications so as to form the composite signal.

The intercom communications circuit is preferably configured to transmit the composite signal to the wired intercom.

Further, according to the preferred embodiment of the present invention, the communications interface adapter facilitates radio communication between a plurality of remotely located radio transceivers and the communications interface adapter comprises a radio receiver for receiving radio communications from the plurality of remotely located radio transceivers and also comprises a radio transmitter for transmitting radio communications to the plurality of remotely located radio transceivers. The radio transmitter is configured to transmit a repeat request to a first remotely located radio transceiver when a second remotely located radio transceiver is out of range with respect to the communications. Transmission of the repeat request facilitates relaying of communications between the communications interface adapter and the second remotely located radio transceiver.

These, as well as other advantages of the present invention, will be more apparent from the following description and drawings. It is understood that changes in the specific structure shown and described may be made within the scope of the claims without departing from the spirit of the invention.

DETAILED DESCRIPTION OF THE PREFERRED EMBODIMENT

The detailed description set forth below in connection with the appended drawings is intended as a description of presently preferred embodiment of the invention, and is not intended to represent the only form in which the present invention may be constructed or utilized. The description sets forth the functions and the sequence of steps for constructing and operating the invention in connection with the illustrated embodiment. It is to be understood, however, that the same or equivalent functions may be accomplished by different embodiments that are also intended to be encompassed within the spirit and scope of the invention. The communications interface adapter of the present invention is illustrated in FIGS. 1 through 4 which depict a presently preferred embodiment thereof.

Figure 1:
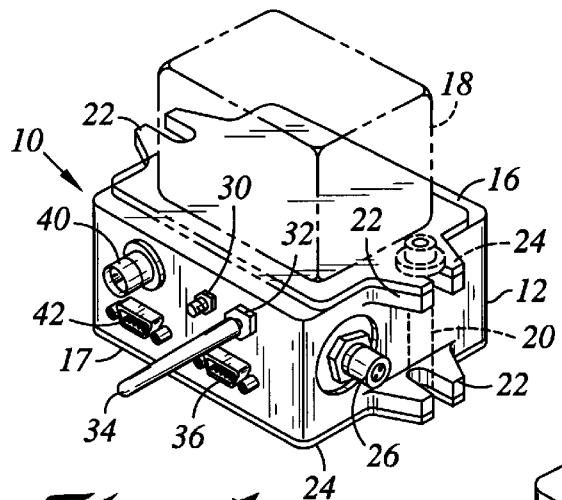
FIG. 1 is a perspective view of the communications interface adapter of the present invention having a crew station mounted thereabove such that the communications interface adapter is sandwiched between the crew station and a vehicle bulkhead.
Figure 2:
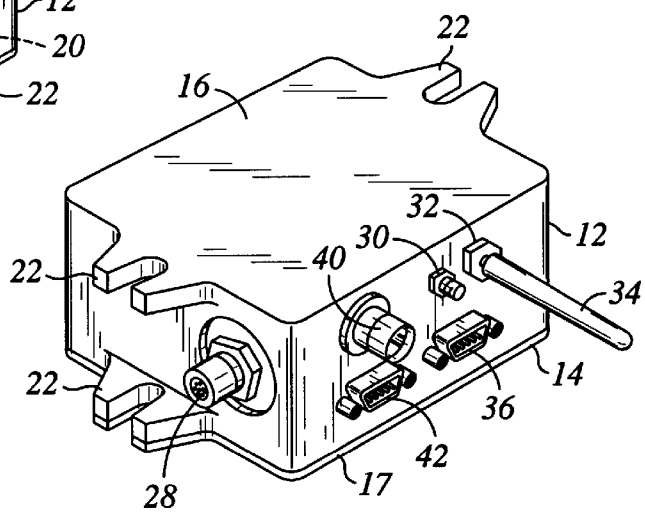
FIGS. 2 and 3 show the communications interface adapter of FIG. 1 with the crew station removed therefrom.
Figure 3:
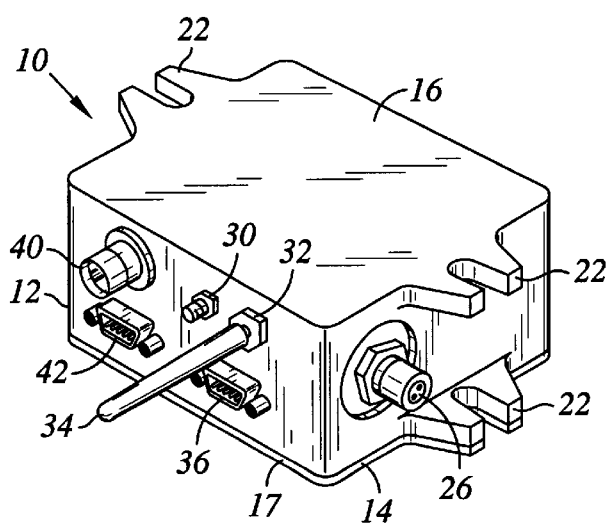

Referring now to FIGS. 1–3, the communications interface adapter of the present invention 10 generally comprises a housing 12 having a cover 14. According to the preferred embodiment of the present invention a seal or gasket seals the lid 14 to the housing 12 so as to prevent the undesirable entry of dirt, moisture, or other contaminants.

According to the preferred embodiment of the present invention the top 16 and bottom 17 surfaces of the communications interface adapter are substantially flat so as to facilitate mounting thereof to a bulkhead, particularly mounting of the communications interface adapter sandwiched between a Crew Station 18 and the bulkhead. Bolts 20 pass through flanges 22 of the communications interface adapter 10, as well as similarly configured flanges 24 of the Crew Station 18 so as to facilitate such mounting to a bulkhead. Alternatively, bolts can be used to join the communications interface adapter 10 to the crew station 18 while a separate set of bolts mount the crew station 18 to a bulkhead.

Figure 4:
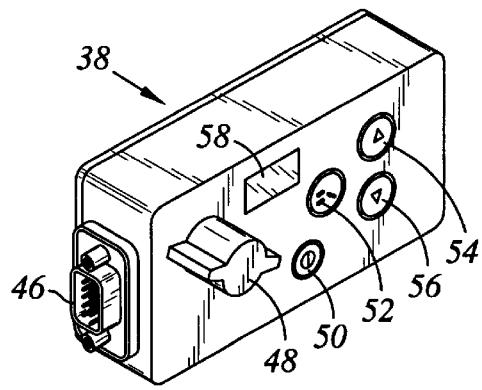
FIG. 4 is a perspective view of the control panel for the communications interface adapter of the present invention.

According to the preferred embodiment of the present invention a two pin power connector is mounted to one side of the housing 12 and a six pin connector for facilitating electrical communication to the Crew Station 18 is mounted on the other side thereof. A first bulkhead mount coax connector 30 facilitates electrical communication from the communications interface adapter 10 to a remote antenna, preferably mounted to the outside of the vehicle. A second bulkhead mount coax connector 32 facilitates electrical communication to an internal vehicle antenna 34, which is preferably mounted directly thereto. A 15 pin connector 36 facilitates electrical connection to a separate control panel 38 (FIG. 4). A six pin circular headset connector 40 facilitates electrical communication between the communications interface adapter 10 and a crew member's headset. A nine pin data connector 42 optionally provides electrical communication to a data input device such as a personal computer.

Referring now to FIG. 4, according to the preferred embodiment, the present invention comprises a separate control panel 38. The separate control panel 38 communicates with the communications interface adapter 10 via a cable connected to the LED display 58 via connector 46 and connected to the communications interface adapter via connector 36. The LED display displays volume setting or channel, for example. The control panel 38 is preferably configured such that it may attach to any convenient surface where it may easily be read and manipulated and located near the crewman or vehicle commander who require direct access.

Rotary selector switch 48 preferably has four positions. In the monitor position thereof, the communications interface adapter is placed in a MONITOR or listen only configuration and crew members can listen to conversations but can not speak. When the rotary selector switch 48 is placed in a LOCAL position, then only the internal antenna in electrical communication with the communications interface adapter 10 is utilized. This effectively limits radio reception to inside the vehicle. Thus when the rotary selector switch 48 is in the Local position, it does not receive radio communications.

When the rotary selector switch 48 is in the BROADCAST position thereof, both the interior antenna 34 and the exterior antenna are utilized. This facilitates communications between radio transceivers within the vehicle, as well as those outside the vehicle, such as those of the SINCGARS military radio system. When the rotary selector switch 48 is in the GROUP position thereof, two or more vehicles are enabled to communicate.

On/off switch 50 is used to place the communications interface adapter 10 into and out of service. When the on/off switch 50 is in the on position, radio communications with the wired intercom system of the vehicle are facilitated, as discussed above. When the switch 50 is in the off position, the wired intercom system of the vehicle operates normally, i.e., as though the communications interface adapter was not installed.

Mode push button 52, up selector pushbutton 54, down selector pushbutton 56, and LED display 58 cooperate with one another so as to facilitate the selection of desired operating parameters for the communications interface adapter 10. For example, the volume, channel (frequency), and any other desired parameters may be selected utilizing the mode push button 52, the up selector push button 54, the down selector push button 56, and the LED display 58.

For example, to select desired channel for radio communications, the mode selector 52 may be depressed repeatedly until a channel number appears in the LED display 58. Then the up selector pushbutton 54 and/or down selector pushbutton 56 may be repeatedly depressed until the desired channel number is displayed. In the same manner, volume and/or any other desired parameters may be changed.

It is understood that the exemplary communications interface adapter described herein and shown in the drawings represents only a presently preferred embodiment of the invention. Indeed, various other modifications and additions may be made to such embodiment without departing from the spirit and scope of the invention. For example, the housing may be of various different shapes and configurations, as desired. Indeed, the control panel may be built into the housing, if desired. Thus, these and other modifications and additions may be obvious to those skilled in the art and may be implemented to adapt the present invention for use in a variety of different applications.

What is claimed is:

1. A communications interface adapter for facilitating both wired and wireless communications between crew members of a vehicle having a wired intercom, crew members having a headset and a portable radio transceiver, the communications interface adapter comprising:

a) an intercom communications circuit having an input/output port for providing electrical communication between the communications interface adapter and the wired intercom;

b) a fixed radio transceiver comprising:
   i) a receive circuit for receiving radio communications and for communicating the received radio communications via the intercom communications circuit to the wired intercom of the vehicle; and
   ii) a transmit circuit for transmitting communications received via the intercom communications circuit from the wired intercom of the vehicle;

c) wherein a crew member is provided wired communications with the wired intercom when the crew member's headset is in electrical communication with the wired intercom and is provided wireless communications with the wired intercom via the fixed radio transceiver and the crew member's portable radio transceiver when the crew member's headset is not in electrical communication with the wired intercom.

2. The communications interface adapter as recited in claim 1, wherein fixed radio transceiver comprises:

a) local antenna disposed proximate the communications interface adapter; and b) remote antenna disposed externally with respect to the vehicle.

3. The communications interface adapter as recited in claim 2, further comprising a selector switch for selecting a desired one of the local antenna and the remote antenna.

4. The communications interface adapter as recited in claim 1, further comprising a data port in electrical communication with the intercom communications circuit for facilitating communication of digital data via the wired intercom of the vehicle.

5. The communications interface adapter as recited in claim 1, further comprising a headset port for facilitating electrical communication with a headset.

6. The communications interface adapter as recited in claim 1, further comprising a first housing within which the intercom communications circuit and the fixed radio transceiver are disposed, the first housing being configured so as to facilitate attachment thereof to a vehicle bulkhead intermediate the vehicle bulkhead and a Crew Station.

7. The communications interface adapter as recited in claim 1, further comprising a second housing within which control circuitry for the communications interface adapter is disposed.

8. The communications interface adapter as recited in claim 7, wherein the control circuitry disposed within the second housing comprises:

a) a rotary selector switch for selecting a desired one of the local antenna and the remote antenna;

b) a mode switch for selecting a desired one of volume or channel number to be changed; and c) a pair of up/down selector switches for changing channel assignments associated with the selected one of wired intercom, and wireless radio communication.

9. The communications interface adapter as recited in claim 7, wherein the first housing and the second housing are in electrical communications with one another via a cable.

10. The communications interface adapter as recited in claim 1, further comprising:

a) an intercom communications circuit for receiving at least one wired intercom signal; and b) wherein the multiplexer is configured to combine the wired intercom signal with the plurality of wireless communications to form the composite signal.

11. The communications interface adapter as recited in claim 10, wherein the intercom communications circuit is configured to transmit the composite signal to a wired intercom.

* * * * *